United States Patent
Morten et al.

(10) Patent No.: US 7,349,886 B2
(45) Date of Patent: Mar. 25, 2008

(54) SECURELY RELAYING CONTENT USING KEY CHAINS

(75) Inventors: Glenn A. Morten, Bellevue, WA (US); Reza P. Rassool, Stevenson Ranch, CA (US)

(73) Assignee: Widevine Technologies, Inc., Seattle, WA (US)

( * ) Notice: Subject to any disclaimer, the term of this patent is extended or adjusted under 35 U.S.C. 154(b) by 0 days.

(21) Appl. No.: 11/388,241

(22) Filed: Mar. 23, 2006

(65) Prior Publication Data

US 2006/0229992 A1    Oct. 12, 2006

Related U.S. Application Data

(60) Provisional application No. 60/665,246, filed on Mar. 25, 2005.

(51) Int. Cl.
  *G06Q 99/00* (2006.01)
(52) U.S. Cl. .......................................... 705/51; 705/50
(58) Field of Classification Search .................. 705/57, 705/50, 51
  See application file for complete search history.

(56) References Cited

U.S. PATENT DOCUMENTS

| | | | |
|---|---|---|---|
| 4,535,355 A | | 8/1985 | Arn et al. |
| 4,802,215 A | * | 1/1989 | Mason ........................ 380/231 |
| 5,870,474 A | | 2/1999 | Wasilewski et al. |
| 5,991,399 A | | 11/1999 | Graunke et al. |
| 6,415,031 B1 | | 7/2002 | Colligan et al. |
| 6,434,535 B1 | * | 8/2002 | Kupka et al. .................. 705/24 |
| 6,834,110 B1 | * | 12/2004 | Marconcini et al. ........ 380/239 |
| 7,039,614 B1 | * | 5/2006 | Candelore .................... 705/57 |
| 2002/0001385 A1 | | 1/2002 | Kawada et al. |
| 2002/0015498 A1 | | 2/2002 | Houlberg et al. |
| 2002/0021805 A1 | | 2/2002 | Schumann et al. |
| 2002/0089410 A1 | | 7/2002 | Janiak et al. |
| 2002/0104004 A1 | | 8/2002 | Couillard |
| 2002/0141582 A1 | | 10/2002 | Kocher et al. |

(Continued)

FOREIGN PATENT DOCUMENTS

EP    0886409 A2    12/1998

(Continued)

OTHER PUBLICATIONS

Hewitt, R., "North America MPEG-2 Information," www.coolstf.com/mpeg, pp. 1-34 (2005).

(Continued)

*Primary Examiner*—Pierre Eddy Elisca
(74) *Attorney, Agent, or Firm*—Darby & Darby PC; Jamie L. Wiegand

(57) ABSTRACT

A system, apparatus, and method are directed towards generating chains of encrypted decryption keys for content in a highly distributed environment. In one embodiment, the key chain may be provided within an Entitlement Control Message (ECM). An access key that enables decryption of a current link within the chain of decryption keys may be provided to a downstream recipient using an out-of-band mechanism. Alternatively, the access key may be provided through an in-band mechanism, such as through the use of Entitlement Management Message (EMM), or the like. In one embodiment, the access key within the EMM may be further encrypted by another encryption key that may be unique to the downstream recipient.

22 Claims, 6 Drawing Sheets

U.S. PATENT DOCUMENTS

2006/0129811 A1* 6/2006 Fiske .......................... 713/167

FOREIGN PATENT DOCUMENTS

JP          2000113587 A  *  4/2000
WO        WO-01/93212 A2    12/2001

OTHER PUBLICATIONS

Namba, S., "Technologies and Services on Digital Broadcasting (6); Scrambling (Conditional Access System)," Broadcast Technology, 12:10-13 (2002).

chiariglione.org, "Riding the Media Bits Protecting Content," www.chiariglione.org/ride/protecting_content/protecting_content.htm, pp. 1-4 (2003).

Wu, Tsung-Li et al., Selective Encryption and Watermarking of MPEG Video (Extended Abstract), Feb. 17, 1997, International Conference on Image Science, Systems, and Technology, 10 pgs.

U.S. Appl. No. 11/361,469, Official Communication mailed May 24, 2007.

U.S. Appl. No. 11/361,469, Official Communication mailed Dec. 20, 2006.

* cited by examiner

SECURELY RELAYING CONTENT USING KEY CHAINS

CROSS-REFERENCE TO RELATED APPLICATIONS

The present application claims priority from provisional application Ser. No. 60/665,246 entitled "Method For Providing Unique Encryption In A Highly Distributed Content," filed on Mar. 25, 2005, the benefit of the earlier filing date of which is hereby claimed under 35 U.S.C. § 119 (e) and 37 C.F.R. §1.78, and which is further incorporated by reference.

BACKGROUND OF THE INVENTION

The present invention relates generally to digital copy protection and more particularly to multiple key encryptions in highly distributed content delivery architectures.

Recent advances in the telecommunications and electronics industry, and, in particular, improvements in digital compression techniques, networking, and hard drive capacities have led to a growth in new digital services to a user's home. For example, such advances have provided hundreds of cable television channels to users by compressing digital data and digital video, transmitting the compressed digital signals over conventional coaxial cable television channels, and then decompressing the signals in the user's receiver. One application for these technologies that has received considerable attention recently includes video-on-demand (VOD) systems where a user communicates with a service operator to request video content and the requested content is routed to the user's home for enjoyment. The service operator typically obtains the content from an upstream market content provider, such as a content aggregator or distributor. The content aggregators, in this market stream, in turn, may have obtained the content from one or more content owners, such as movie studios.

While the video-on-demand market stream provides new opportunity for profits to content owners, it also creates a tremendous risk for piracy of the content. Such risk for piracy may arise at any place in the market stream that the content is exposed. Without appropriate protection, the content can be illicitly intercepted, stolen, copied, and redistributed, thus depriving content owners of their profits.

Current approaches to protecting the video content provide only partial or incomplete solutions. For example, many of today's implementation of digital rights management (DRM) systems restricts access to the video content to a specific hardware device. This reduces the flexibility and enjoyment of the video content by the user. It may also reduce the acceptance of such DRM implementations by the user.

Those DRM systems that do not lock viewing of the video content into a specific device often employ pre-encryption techniques that make it difficult to determine a source of unauthorized distribution of the video content in highly distributed systems.

Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
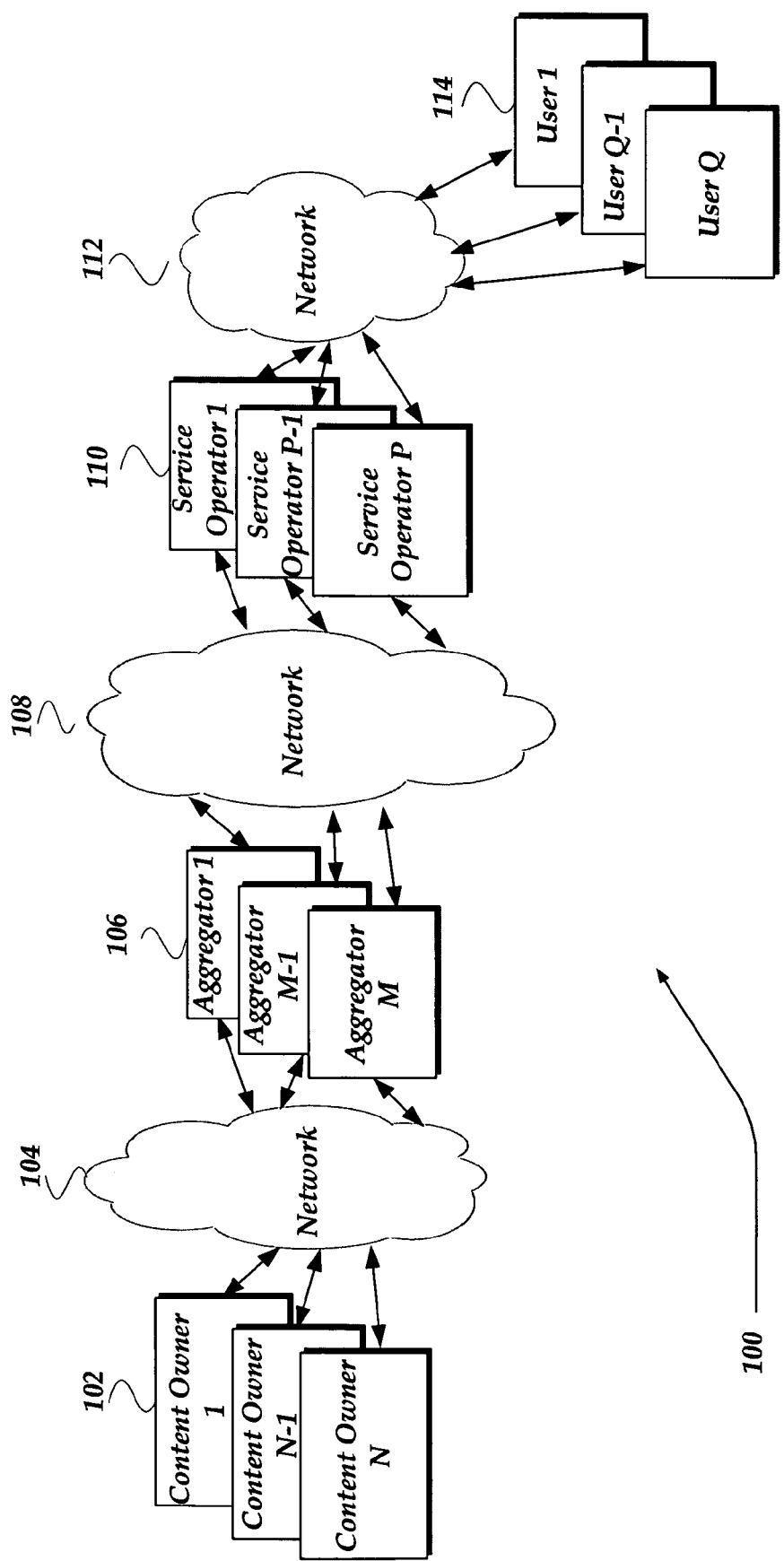
FIG. 1 is a functional block diagram illustrating an exemplary operating environment 100 in which the invention may be implemented.

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. The phrase "in another embodiment" as used herein does not necessarily refer to a different embodiment, although it may. Thus, it is apparent that various embodiments as described herein may be combined with other embodiments, without departing from the scope or the spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "trusted device" or "trusted system" is device or system that cannot easily be illegally compromised to enable access to content within by an unauthorized entity. The trusted device or system provides for user authentication and protection of content managed within it. In one embodiment, a trusted device or system includes secure software, but may also include security hardware. Thus, an "untrusted device" or "untrusted system" is a device or system that may be hacked or otherwise compromised such that data managed within it may be made accessible, typically as unencrypted data, to an improper entity.

As used herein, the phrase "in-band" indicates that data, such as a decryption key, or the like, is communicated to a recipient along with the content. Thus, the term "out-of-band" indicates that the data, such as a decryption key, or the like, is communicated to a recipient distinct from the content. The out-of-band data may be communicated to the recipient using a substantially similar network path, connections, portable content device, or the like, however. For example, content may be communicated using a network, and the out-of-band data may also be communicated using the network, but, is communicated separate from sending of the content.

Briefly stated, the present invention provides a system, apparatus, and method for generating chains of encrypted decryption keys within an Entitlement Control Message (ECM) for content in a highly distributed environment. An access key that enables decryption of a current link within the chain of decryption keys may be provided to a recipient using an out-of-band mechanism. Alternatively, the access key may be provided through an in-band mechanism, such as through the use of Entitlement Management Message (EMM), or the like. In one embodiment, the access key within the EMM may be further encrypted by another encryption key that may be unique to the recipient.

Illustrative Environment

FIG. 1 is a functional block diagram illustrating an exemplary operating environment 100 in which the invention may be implemented, in accordance with the present invention. The operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes content owner(s) 102 (1 through N), aggregator(s) 106 (1 through M), service operator(s) 110 (1 through P), user(s) 114 (1 through Q), and networks 104, 108, and 112.

Content owner(s) 102 (1 through N) are coupled to and in communication with network 104. Aggregator(s) 106 (1 through M) are coupled to and in communication with network 104 and network 108. Service operator(s) 110 (1 through P) are coupled to and in communication with network 108 and network 112. User(s) 114 (1 through Q) are coupled to and in communication with network 112.

Content owner(s) 102 (1 through N) include producers, developers, and owners of content that can be distributed to user(s) 114. Such content includes pay-for-view or time and subscription television, movies, interactive video games, interactive news television, catalogue browsing, distance learning, video conferencing, and the like. It is apparent that such content owned by content owner(s) 102 is not limited to video content only, and may include audio only services, without departing from the scope or spirit of the present invention. Thus, content is intended to include, but not be limited to, audio, video, still images, text, graphics, and other forms of content directed towards a user.

In one embodiment, the content is provided as a Moving Pictures Experts Group (MPEG) content stream, such as a transport stream, or the like. However, the invention is not so limited, and other file formats may also be employed, without departing from the scope or spirit of the invention.

Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available at http://www.iso.org), which is hereby incorporated by reference.

Briefly, MPEG content streams may include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames may include intra-frames (I-frames), forward predicted frames (P-frames), and/or bi-directional predicted frames (B-frames).

Moreover, the content may be distributed to various participants within operating environment 100 as selectively encrypted content. For example, in one embodiment, content owner(s) 102 may selectively encrypt at least a portion of the content, while leaving another portion unencrypted. Content owner(s) 102 (or another participant in operating environment 100) may select to encrypt a video elementary stream (ES), an audio ES, a digital data ES, and/or any combination, and/or any portion of video, audio, data elementary streams of the content. In one embodiment, at least one portion of the content may be selectively encrypted using one content encryption key, while another portion of the content may be selectively encrypted using another content encryption key. It is noted, however, the content owner(s) 102 may also select to encrypt all of the content, without departing from the scope or spirit of the invention.

Content owner(s) 102 may further select to encrypt at least a portion of the content using any of a variety of encryption techniques, including, but not limited to RSA algorithms, Data Encryption Standard (DES), International Data Encryption Algorithm (IDEA), Skipjack, RC4, Advanced Encryption Standard (AES), Elliptic Curve Cryptography, or the like. Moreover content owner(s) 102 may perform such encryption on-the-fly.

Content owner(s) 102 may provide a decryption key that may be used to decrypt the selectively encrypted content, along with content attribute information, rights, and entitlements to access the content in an Entitlement Control Message (ECM). Briefly, an ECM is typically a packet which includes information to determine the decryption key, also known as the content key or control word, for use in decrypting the content. The decryption key may be encrypted with a service key and provided within the ECM message. In one embodiment, the ECM is provided in-band along with the selectively encrypted content.

The service key may then be encrypted using an encryption key, herein referred to as an access key, that may be specific to a recipient of the selectively encrypted content, and sent within a message frame, packet, or the like. For example, in one embodiment, the encrypted service key may be sent within an Entitlement Management Message (EMM). In one embodiment, the EMM may also include additional information such as subscription information, or the like, associated with the recipient. In one embodiment, the access key may be provided using an out-of-band mechanism. For example, the access key may be provided using any of the variety of portable storage devices described below, out-of-band over a network, via a virtual smart card, or the like.

In traditional DRM mechanisms of relaying content securely a relaying device may decrypt the encrypted content key using a session key and thereafter re-encrypt the content key using a new encryption key, the re-encrypted content key being used in place of the previous one, together with the scrambled transmission data associated with that content key.

However, unlike the traditional DRM mechanisms, with the present invention, the relaying device does not decrypt the content key. Instead the relaying device encrypts the session key (or access key) with a new access key of its own choosing. The relaying device then appends the encrypted session key (or access key) to the encrypted content key that is combined with the encrypted content. This then results in a key chain where the outermost key may be used to decrypt the next inner key and so forth, until the content key is decrypted. Moreover, in traditional DRM implementations the content key is carried in an ECM in-band with the encrypted content. In one embodiment, in order to support a key chain that can possibly grow in size at each relaying node this invention may employ the concept of variable sized ECMs that may grow in size as additional keys are appended. In one embodiment, however, an ECM may include non-used values that may provide an ECM of sufficient size, such that as the key chain expands, the ECM overall size does not. Instead, non-used values within the ECM are replaced with the key chain.

Aggregator(s) 106 may include distributors and other businesses that obtain rights to distribute content from content owner(s) 102. Aggregator 106 may obtain the rights to distribute from one or more content owners. Each aggregator 106 may also repackage, store, and schedule content for subsequent sale or license to other aggregator(s) 106 and service operator(s) 110. Moreover, it is apparent that content owner 102 may function in the role of both a content owner and an aggregator or distributor of content.

Service operator(s) 110 include businesses that are directed at providing content to user(s) 114. Service operator(s) 110 include businesses that provide and manage the infrastructure between user(s) 114 and the service operator's facilities. Moreover, it is apparent that content owner 102 or aggregator 106 may function in the role of service operator without departing from the spirit or scope of the present invention.

User(s) 114 include end-users and consumers of content. User(s) 114 may employ various devices to enjoy the content, including but not limited to television appliances, digital recorders, set-top boxes (STBs), mobile device, PDAs, personal computers, cellular phone, jukeboxes, or the like. User(s) 114 may request content delivery directly from content owner(s) 102, or at any point along the market stream (e.g., from aggregator(s) 106, or service operator(s) 110). Moreover, user(s) 114 may receive content through multiple sources within the market stream. Additionally, user(s) 114 may select to transfer or share content between other users. Finally, user(s) 114 may select to pay for content out of band of operating environment 100, or through networks 104, 108, and/or 112 to an upstream market seller.

Networks 104, 108, and 112 can employ any form of computer readable media for communicating information from one electronic device to another. In addition, networks 104, 108, and 112 can include the Internet in addition to local area networks (LANs), wide area networks (WANs), direct or indirect connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Also, communication links within networks 104, 108, and 112 typically include fiber, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other communications links known to those skilled in the art. Furthermore, remote computers and other related electronic devices can be remotely connected to other networks via a modem and telephone link, providing a modulated data signal such as a carrier wave or other transport mechanism or information delivery media.

The term "modulated data signal" means a signal that has one or more of its characteristics set or changed in such a manner as to encode information in the signal. Carrierless AM/PM (CAP), Discrete Multitone Transmission (DMT), and Frequency Division Multiplexing (FDM) may be included as modulation techniques employed to generate the modulated data signal to transport content through operating environment 100 of FIG. 1.

Operating environment 100 may enable various participants to provide content over a network (104, 108, or 112). However, the invention is not limited to using networks. For example, content may also be distributed between participants within operating environment 100 using any of a variety of other mechanisms, including but not limited to such portable content devices as Digital Versatile Discs (DVDs), High Definition DVD (HD-DVD), Compact Discs (CDs), Video Compact Disc (VCD), Super VCD (SVCD), Super Audio CD (SACD), Dynamic Digital Sound (DDS) content media, Read/Write DVD, CD-Recordable (CD-R), Blu-Ray discs, portable memory flash drives, or the like. In one embodiment, content may be distributed using a network between some participants, and/or a portable storage device such as mentioned above between other participants. Moreover, in one embodiment, the content may be communicated between participants using a cellular telephone, or other mobile communications device.

Figure 2:
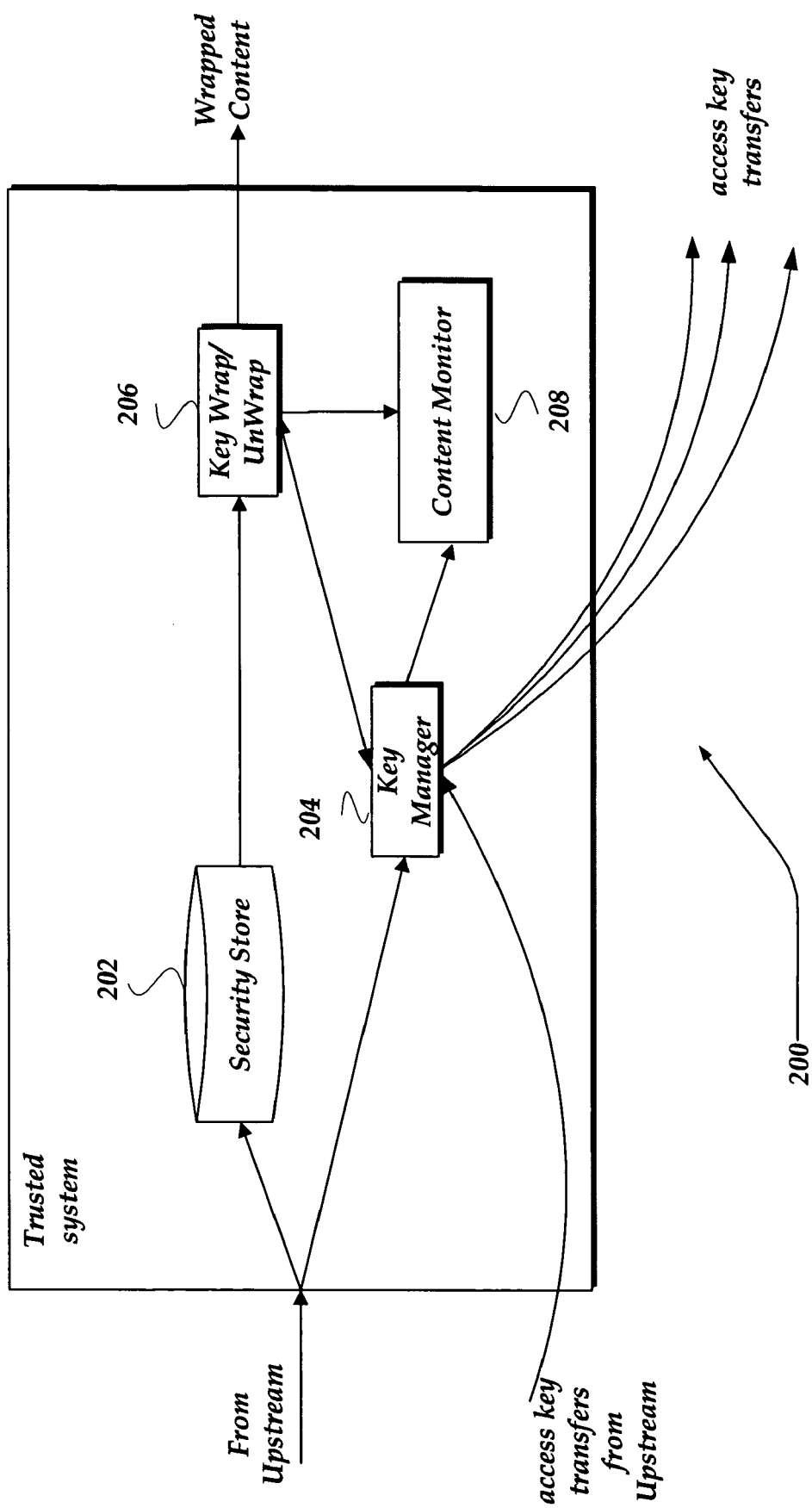
FIG. 2 is a functional block diagram of an embodiment of a trusted system employing components for managing content in highly distributed environment.

FIG. 2 is a functional block diagram of an embodiment of a trusted system employing components for managing content in highly distributed systems. Trusted system 200 of FIG. 2 may include many more components than those shown. The components shown, however, are sufficient to disclose an illustrative embodiment for practicing the invention. In one embodiment, trusted system 200 may represent aggregator 106, service operator 110, and/or even user 114 of FIG. 1.

As shown in the figure, trusted system 200 includes security store 202, key manager 204, key wrap/unwrap 206, and content monitor 208. Trusted system 200 may also include more security components than shown in the figure.

Trusted system 200 is configured to receive content from another market provider. In one embodiment, the content may be received over a network, however, the invention is not so constrained, and the content may be received using any of a variety of other mechanisms, including those described above in conjunction with FIG. 1. Typically, the content is encrypted, by the other market provider.

Trusted system 200 may decrypt content for various reasons. For example, encrypted content may be decrypted to examine the quality of the content prior to payment, to view the content, to repackage the content, or the like. Moreover, content may be decrypted because a connection to a downstream (or other) recipient may preclude transmission of encrypted content.

Because trusted system 200 is considered to be trusted, trusted system 200 is also configured to receive access keys from the content provider, and to employ the access keys, in part, to access decrypted content. The access key may be communicated to trusted system 200 by email, phone, fax, hard mail, or by a separate communications through a network. An access key transfer may also be out-of-band via, for example, a smart card, a virtual smart card, over a cellular telephone, over a network, via any of the portable storage devices described above, or other similar devices. Moreover, access key transfers may be made through a key exchange technology such as Diffie-Hellman, a Public Key Infrastructure, or the like. In one embodiment, the access keys may be transferred in-band with the content. However, this in-band transmission of the access keys does not imply any required synchronization between the encrypted content and the access key. The access key may be sent long in advance of the content.

Key manager 204 is configured to manage encryption/decryption keys for trusted system 200. Key manager 204 is described in more detail below in conjunction with FIG. 4. Briefly, however, key manager 204 includes management of the symmetric keys of trusted system 200 that may be employed for signing of content or encrypting and decrypting the content. Moreover, key manager 204 generates access keys that may be communicated to downstream market recipients of the selectively encrypted content. In one embodiment, key manager 204

Moreover, key manager 204 may be implemented within virtually any non-removable storage device, including, but not limited to a hard disk, Random Access Memory (RAM), non-volatile memory such as flash memory, and/or any other memory architecture, non-removable CD-ROM, DVD, and/or any other optical storage, magnetic cassettes, magnetic tape, magnetic disk storage and/or any other magnetic storage devices, and/or any other medium that can store information that can be accessed by trusted system 200.

Unencrypted content may be made available through content monitor 208. Content monitor 208 may be configured to enable viewing, or otherwise inspecting the content. In one embodiment, content monitor 208 includes one of a television appliance, STB, mobile device, PDA, personal computer, server device, cellular phone, jukebox, or the like. In one embodiment, although not shown, trusted system 200 may also be configured to store the decrypted content in a data store, such as a security store, or the like.

Security store 202 is directed towards the receiving and storing of encrypted content. Thus, security store 202 may include a database, a flat data file, a folder, or the like. Security store 202 may be implemented within virtually any non-removable storage device, including those described above.

Key wrap/unwrap 206 is configured to provide a public/private encryption key wrap to encrypted content as it is communicated to a downstream market recipient, such as service operator(s) 110 (1 through Q). In one embodiment, key wrap/unwrap 206 receives the encryption/decryption keys employed during the wrapping or unwrapping of the encrypted content from key manager 204. In other embodiment of the present invention, key wrap/unwrap 206 generates and manages its own encryption/decryption keys. Key wrapping is described in more detail below in conjunction with FIG. 5.

Trusted system 200 may further include additional security components not illustrated within FIG. 2. For example, trusted system 200 may include such components as an intrusion detection component, anti-copy components, anti-theft components, or the like, without departing from the scope or spirit of the invention. Such security components may, for example, upon detection of an attempted hack or other tampering of trusted system 200, disable access to content, destroy the content, disable at least some functions of trusted system 200, provide a message to an upstream market content provider, or the like.

Figure 3:
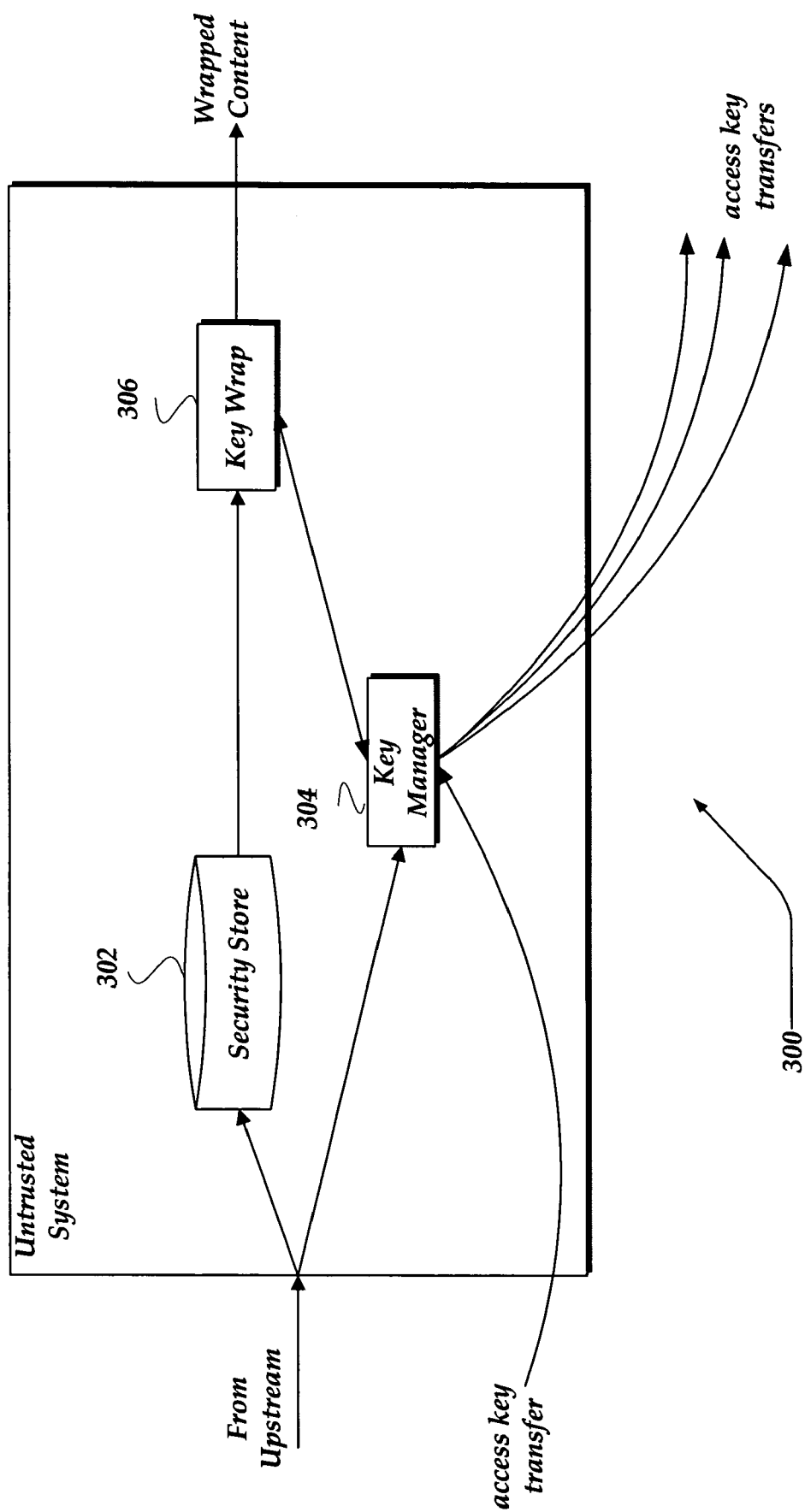
FIG. 3 is a functional block diagram of an embodiment of an untrusted system employing components for managing content in highly distributed environment.

FIG. 3 is a functional block diagram of an embodiment of an untrusted system employing components for managing content in highly distributed systems. Because untrusted system 300 of FIG. 3 is considered to be untrusted, such that decrypted content could be improperly accessed, untrusted system 300 is configured to restrict decryption of the content. Such configurations may be useable, for example, as relay components within the market stream of operating environment 100 of FIG. 1. Such relay components may be used by an aggregator, service provider, or even within one or more of the networks of FIG. 1.

Thus, as shown in FIG. 3, untrusted system 300 may include substantially the same security components as trusted system 200, shown in FIG. 2, absent, however such functional components as monitor 208, and unwrap and/or decryption functions within key wrap/unwrap 206, key manager 304, or the like. As shown in FIG. 3, untrusted system 300 includes security store 302, key manager 304, and key wrap 306. Key wrap 306 is in communication with security store 302 and key manager 304. Key wrap 306 is configured to operate substantially similar to key wrap/unwrap 206 of FIG. 2, absent key chain unwrap functionality. Security store 302 is similar to security store 202 of FIG. 2, and key manager 304 is similar to key manager 204 of FIG. 2, absent, however, in one embodiment a decryption capability.

In addition, untrusted system 300 may also include more security components than shown in the figure. For example, in one embodiment, although not illustrated, untrusted system 300 may include such components as an intrusion detection component, anti-copy components, anti-theft components, or the like.

Untrusted system 300 may receive content and access keys from an upstream market provider, such as aggregator 106, content owner 102, or the like, of FIG. 1, and in turn provide the selectively encrypted content and/or access keys to a downstream market recipient. Untrusted system 300 may also provide selectively encrypted content and/or access keys to other untrusted systems, and/or a trusted system.

Figure 4:
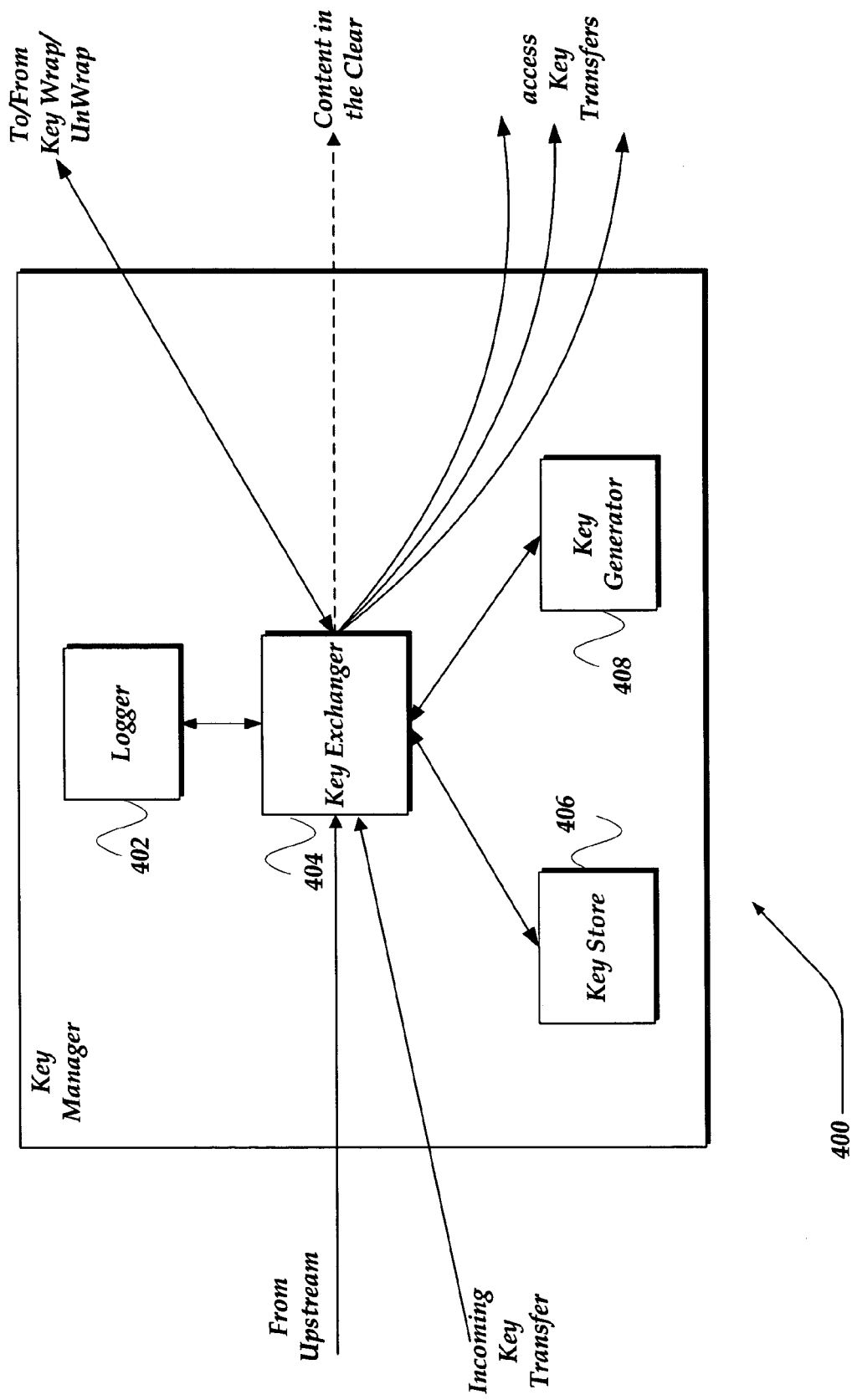
FIG. 4 is a functional block diagram of an embodiment of Key Manager components in an illustrative environment.

FIG. 4 is a functional block diagram of an embodiment of Key Manager components in an illustrative environment. Key manager 400 may be, for example, key manager 204 and 304 of FIGS. 2 and 3, respectively. Key Manager 204 in FIG. 4 is an illustration of only one embodiment and is not intended to suggest any limitations as to the scope of use or functionality of the present invention.

It will be understood that each component of FIG. 4, and combinations of components, can be implemented by computer program instructions, hardware, or a combination of hardware and computer program instructions. Moreover, although FIG. 4 illustrates distinct components, the present invention is not so limited. For example, several components may be combined, without departing from the spirit or scope of the present invention.

As shown in FIG. 4, key manager 400 includes logger 402, key exchanger 404, key store 406, and key generator 408.

Logger 402 is coupled to and in communications with key exchanger 404. Additionally, key store 406 and key generator 408 are each coupled to and in communications with key exchanger 404.

As described above, key manager 400 is configured to receive content and out-of-band access keys from an upstream market provider, such as content owner(s) 102, or the like. Key manager 400 also manages encryption/decryption keys that are employed by key wrap/unwrap 206 (or key wrap 306) during generation of multiple key wrapped content and associated key chaining. Moreover, key manager 400 generates and communicates access keys for downstream market recipients of encrypted content, such as user(s) 114, or the like.

Key generator 408 includes hardware and related software configured to provide access keys on the fly that may be employed during the wrapping of content.

Key generator 408 may generate a private/symmetric encryption/decryption key as well as a public/private encryption/decryption key pair. The keys provided by key generator 408 may be implemented in any of a number of encryption techniques, including, but not limited to, RSA, Merkle-Hellman, Elliptic Curve Cryptography, DES, Triple DES, and AES. Key generator 408 may also be configured to provide public/private keys to support a Public Key Infrastructure (PKI). For example, in one embodiment, the invention may employ PGP, X.509, or the like. Whatever technology is employed, the keys are generated to be uniquely associated with a particular downstream market recipient.

Key store 406 is configured to receive and retain incoming access keys from key exchanger 404. Key store 406 may include a database or flat data file, or the like, configured to retain incoming access keys in a secure manner. Key store 406 securely retains the received access keys until key exchanger 404 requests them for decryption of encrypted content corresponding to the stored access key. In one embodiment of the present invention, key store 406 also is configured to retain in a secure manner the access key generated by key generator 408 for a unique downstream market recipient.

Logger 402 is configured to log information about access keys that are received from an upstream provider. Information logged by logger 402 includes with which encrypted content an access key is associated, when the access key is received, and from whom.

Moreover, logger 402 records information about encryption/decryption keys generated by key generator 408 for key wrap/unwrap 206 and for access key transfers. The information logged by logger 402 also includes when the keys were generated, for which content, and specifically for whom the keys were generated.

Key exchanger 404 includes software and related hardware configured to manage the exchange of encryption/decryption keys. Key exchanger 404 in conjunction with key unwrap/unwrap 206 and other services (not all shown) receive wrapped, encrypted content, and an associated key chain, and provide unwrapped, unencrypted content such as in a trusted system. In one embodiment, the unencrypted content then may be made available for viewing and/or inspection.

Key exchanger 404 is also configured to request storage of incoming access keys. Furthermore, key exchanger 404 is arranged to generate requests for uniquely identifiable access keys and to communicate the access keys to a uniquely identified downstream market recipient.

A benefit of this invention is that it enables content to be securely relayed through a multi-system (multi-node) network where any of the network systems can be either trusted or untrusted. In one embodiment, the untrusted system might not include a security module that may use the access key it receives and thereby decrypt the content. The untrusted system may however be capable of encrypting the access key with its own key, called a distribution key, and send it on to a target system. The distribution key may be considered, in one embodiment, as the last access key used to encrypt the outermost access key in a chain of keys. The distribution key may be sent to the target system using a variety of mechanisms. The target system may, if capable, decrypt the content by first decrypting the access key with the received distribution key and then decrypting the content key with the access key, which may then be used to decrypt the content. If the target system is not configured with a decryption component to use the access key, it might only be able to relay the encrypted content. There are a number of mechanisms it can employ to relay the content. In one method the relay system could decrypt the access key with the received distribution key and the re-encrypt the access key with its own distribution key. In another method the relay system could simply encrypt the received distribution key with its own distribution key and then append it to the key chain in the ECM.

Another benefit of the invention is that the very sensitive decryption client need not be released to systems that are only used for relay purposes.

Moreover, a further benefit of the invention is that each system may apply its own crypto-algorithm to relay the content. If the receiving system does not support the crypto-algorithm it does not prevent it from being able to securely relay the content.

One envisioned use of the invention is in a peer-to-peer network. Such networks are often used in low-cost distribution of content. However, content owners have to date held that the security risks far outweigh a benefit of their efficiency of 'viral' content distribution. The key chain relay approach described herein is then directed towards enabling each peer system to operate as part of peer-to-peer distribution network. When a system is determined to have satisfied a predetermined security criterion, the system might then be configured with the appropriate security modules to allow access to the content.

Key Wrap of Content

Figure 5:
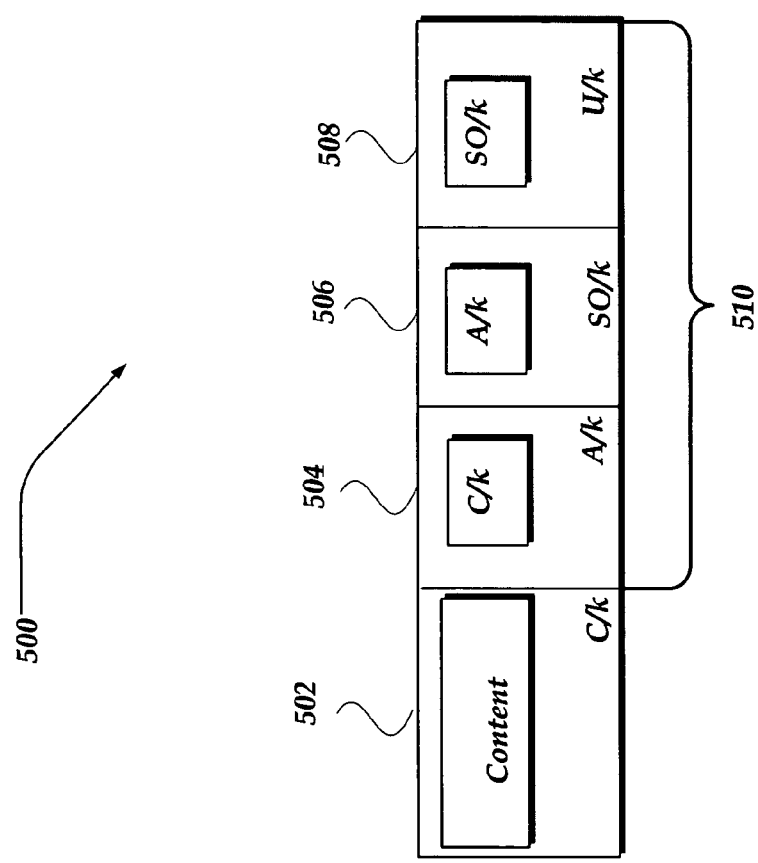
FIG. 5 is a diagram of an embodiment of a key wrap (key chain) data format.

FIG. 5 is a diagram of an embodiment of a key wrap data format, in accordance with the present invention. As shown in the figure, key wrap data format 500 includes wrapped content 502, key wrappers 504, 506, and 508. Key wrappers 504, 506, and 508 comprise key chain 510. In one embodiment, key wrap data format 500 represents a data structure, with a first data field comprising selectively content (wrapped content 502), and a second data field that comprises key chain 510.

Wrapped content 502 includes selectively encrypted content that has been encrypted typically by a content owner's symmetric encryption key, C/k.

Key wrapper 504 includes a content owner's symmetric encryption key C/k that has been uniquely encrypted by an aggregator's encryption key, A/k. By encrypting symmetric encryption key C/k with a particular aggregator's encryption key A/k, only that aggregator should be able to decrypt the wrapped symmetric encryption key C/k, and thereby access the encrypted content. Moreover, aggregator's encryption key A/k, may be the access key communicated to that particular aggregator.

Key wrapper 506 includes an aggregator's session key, encrypted by a particular service operator's encryption key, SO/k. In a substantially similar approach, key wrapper 508 includes service operator's session key, encrypted with a particular user's encryption access key, U/k.

By wrapping and attaching the upstream content provider's encryption keys with the recipient's access key a content owner may later determine the end-to-end flow of the content. More particularly, because the key wraps are uniquely associated with each downstream market recipient, a source of unauthorized distribution of content may be more easily identified.

Although the above-described key wrap data format 500 may be employed for an entire content session employing a single instance of C/k, A/k, SO/k, and U/k keys, the present invention is not so limited. For example, C/k, A/k, SO/k, or U/k keys may be regenerated based on a predetermined condition, thereby providing a conditional access system with rotating key wraps, without departing from the spirit or scope of the present invention. Moreover, multiple aggregators' and/or service operators' access keys may be employed to wrap content and generate a key chain. For example, there may be A1/k, A2/k . . . An/k key wraps, and associated keys within a key chain. Thus, key chain 510 may include more or less key wraps than illustrated. In one embodiment, key chain 510 may be provided to a recipient within an ECM.

It should be noted, then that key chain 510 may 'grow' in length (e.g., overall size) as additional keys are appended, and similarly 'shrink' in size, as appended keys are removed. Thus, in one embodiment, key chain 510 may be included within a variable sized ECM. However, the invention is not so limited. For example, in one embodiment, a non-variable sized ECM may have sufficient non-used or unassigned data within it, which may be used or replaced by key chain 510 as key chain 510 expands, without departing from the scope or spirit of the invention.

Generalized Operation

The generalized operation of one embodiment will now be described with respect to FIGS. 1-4, in accordance with the present invention.

As shown in FIG. 1, content owner 102 (N) may select to provide content to aggregator 106 (M) through network 104. In so doing, content owner 102 (N) may employ a bridge (not shown), and key manager 400 (FIG. 4) to uniquely encrypt the content as it is transmitted (e.g., encrypted on the fly) to aggregator 106 (M).

As the encrypted content is received, aggregator 106 (M) stores it in a security store (such as illustrated in FIGS. 2-3). If aggregator 106 (M) wishes to inspect the encrypted content and is so enabled, key manager 400 may be employed to decrypt the content with the access keys received from content owner 102 (N).

Aggregator 106 (M) may also select to transmit encrypted content to service operator(s) 110. If aggregator 106 (M) selects to transmit encrypted content, the encrypted content is communicated to a key wrap/unwrap component, along with an access key uniquely generated for a particular service operator 110.

The key wrap/unwrap component may employ the access key to 'wrap' the encrypted content with a signed and encrypted wrapper. Key wraps and the generation of a key chain is described in conjunction with FIG. 5 above.

While the wrapped encrypted content is communicated to service operator 110, the key manager also communicates to service operator 110 the access key associated with the wrapped encrypted content.

As the wrapped encrypted content and access key are received by service operator 110, substantially similar processes as described above may be performed, until the encrypted content is transmitted to user(s) 114.

Figure 6:
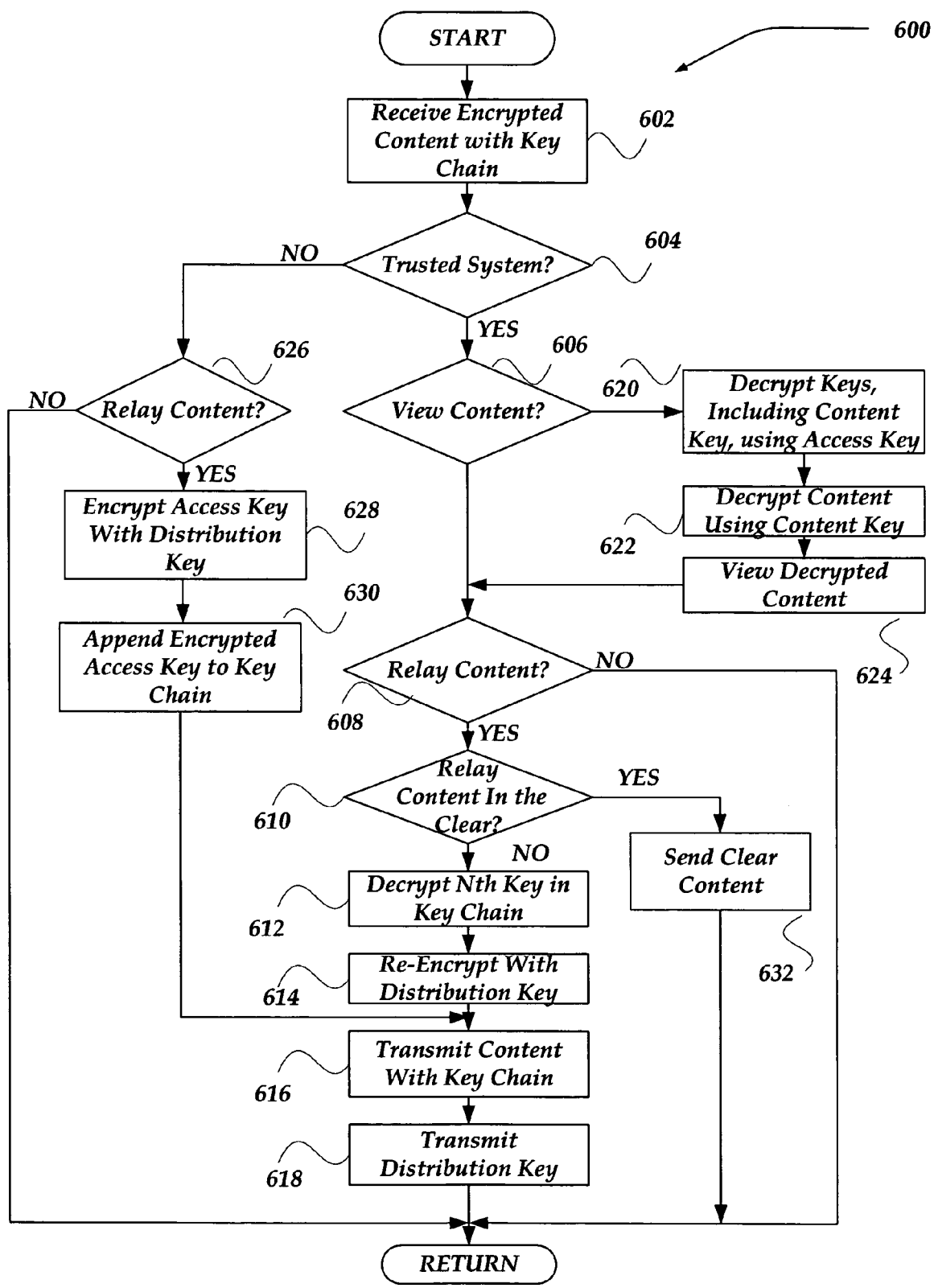
FIG. 6 illustrates a logical flow diagram generally showing one embodiment of a process of key chaining using trusted and/or untrusted network systems, in accordance with the present invention.

FIG. 6 illustrates a logical flow diagram generally showing one embodiment of a process of key chaining using trusted and/or untrusted network systems, in accordance with the present invention. As such, process 600 of FIG. 6 illustrates actions that may be performed, at least in part, by a trusted system, such as described in conjunction with FIG. 2, and/or at least in part, by an untrusted system, such as described in conjunction with FIG. 3.

Process 600 begins, after a start block, at block 602 when content is received. The content is typically encrypted with a content key. Furthermore, in one embodiment, embedded in a content stream, or the like, may be an ECM stream that may include a key chain such as described above in conjunction with FIG. 5. The key chain may include n keys, where n is one or more. In one embodiment, an EMM may also be received that includes an access key that may be used by a trusted system to decrypt the nth key in the key chain. In another embodiment, the access key may be received through an out-of-band process.

Thus, processing proceeds to decision block 604, where a determination is made whether the system is a trusted system or an untrusted system. Determination of whether the system is trusted may be based on a variety of information, including, but not limited to a digital certificate, an availability of a decryption component, or the like. In any event, if the system is untrusted, processing flows to decision block 626; otherwise, processing flows to decision block 606.

At decision block 606, a determination is made whether the content is to be viewed, enjoyed, monitored, or otherwise examined. If the content is to be viewed, or the like, processing flows to block 620; otherwise, processing flows to decision block 608.

At block 620, the received access key is employed to decrypt the n keys in the key chain, including the content key. Processing continues to block 622, where the decrypted content key may be used to decrypt the content. Continuing to block 622 the decrypted content may then be viewed, monitored, or the like. In one embodiment, the decrypted content (e.g., content in the clear) may be stored by the trusted system in a data store. Processing then flows to decision block 608.

At decision block 608, a determination is made whether the content is to be relayed to another system, such as another market participant, as shown in FIG. 1. If the content is not to be relayed, processing may return to another calling process to perform other actions. However, if the content is to be relayed to another market participant, processing continues to decision block 610.

At decision block 610, a determination is made whether the content is to be relayed in the clear (e.g., un-encrypted). If the content is to be sent in the clear, processing flows to block 632, where the content may be sent to the other market participant in the clear. Processing then returns to another calling process to perform other actions. If the content is not to be sent in the clear, however, processing flows to block 612.

At block 612, in one embodiment, the nth key in the key chain may be decrypted, if not already. Processing flows next to block 614, where the decrypted key may be re-encrypted using a distribution key, or the like, and appended to the key chain. Processing continues to block 616, where the encrypted content and the key chain may be sent to the market participant. Processing flows next to block 618, where the distribution key may be sent to the market participant. In one embodiment, the distribution key may be sent within an EMM. In another embodiment, the distribution key may be sent out-of-band. In any event, processing then returns to another calling process to perform other actions.

Where the system is untrusted, processing flowed to decision block 626, from decision block 604, to determine whether the untrusted system is to relay the content. If it is determined that the untrusted system is to relay the content, processing flows to block 628; otherwise, processing returns to another calling process to perform other actions.

At block 628, the access key received at block 602 may be encrypted (or wrapped) using a distribution key. The encrypted access key may then be appended to the key chain, at block 630. Processing then flows to blocks 616 and 618, to perform actions as described above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the embodiments of the invention. However, many other embodiments of the invention can be made without departing from the spirit and scope of the invention.

What is claimed as new and desired to be protected by Letters Patent of the United States is:

1. An apparatus for use in securely relaying content, comprising:
   a processor; and
   a memory in communication with the processor and for use in storing data and machine instructions that causes the processor to perform actions, including:
      receiving content, the content being selectively encrypted with a content key;
      receiving with the selectively encrypted content, a key chain, the key chain comprising the content key, the content key being encrypted with a first access key;
      receiving the first access key;
      encrypting the first access key using a second access key;
      appending the encrypted first access key to the key chain, wherein the key chain comprises the encrypted content key, and the encrypted first access key; and
      providing the second access key to another apparatus, wherein the other apparatus if is a trusted system is enabled to perform actions, including:
         employing the second access key to decrypt the first access key;
         employing the first access key to decrypt the content key; and
         employing the content key to decrypt the content.

2. The apparatus of claim 1, wherein the key chain is provided within an ECM to the other apparatus.

3. The apparatus of claim 1, wherein providing the second access key to the other apparatus further comprises providing the second access key within an EMM in-band with the selectively encrypted content.

4. The apparatus of claim 1, wherein providing the second access key to the other apparatus further comprises providing the second access key out-of band from the selectively encrypted content using at least one of a network, a virtual smart card, a portable content device, over a cellular telephone.

5. The apparatus of claim 1, wherein if the other apparatus is an untrusted system, inhibiting the other apparatus from decrypting the selectively encrypted content.

6. The apparatus of claim 1, wherein the other apparatus is configured to encrypt the second access key with a third access key, and to append the encrypted second access key to the key chain.

7. A method of securely providing content, comprising:
   receiving a key chain multiplexed with selectively encrypted content, the key chain comprising:
      a content key encrypted with a first access key;
      the first access key encrypted with a second access key; and
      the second access key encrypted with a third access key; and
   receiving the third access key;
   employing the third access key to decrypt the second access key;
   employing the second access key to decrypt the first access key; and
   employing the first access key to decrypt the content key, the content key enabling decryption of the selectively encrypted content.

8. The method of claim 7, wherein the key chain is received within an ECM.

9. The method of claim 7, wherein the third access key is received in-band with the content.

10. The method of claim 7, wherein the third access key is received out-of band to the content.

11. A modulated data signal configured to include program instructions for performing the method of claim 7.

12. A computer-readable medium encoded with a data structure for providing secure content over a network, the data structure comprising:
   a first data field comprising selectively encrypted content, the content being selectively encrypted using at least one content key, wherein the selectively encrypted content further comprises at least a portion of at least one of a video elementary stream (ES), audio ES, intra-frames (I-frames), forward predicted frames (P-frames), or bi-directional predicted frames (B-frames) being encrypted, while at least another portion of the content is unencrypted;
  a second data field comprising a key chain, wherein the key chain comprises:
    the at least one content key encrypted using a first access key; and
    the first access key encrypted using a second access key.

13. The computer-readable medium of claim 12, wherein the second access key is provided out-of-band from the data structure.

14. The computer-readable medium of claim 12, wherein the key chain further comprises n access keys, n being greater than two, each of the n access keys being encrypted using an n+1 access key.

15. The computer-readable medium of claim 12, wherein the second access key is unique to a recipient device.

16. A system of securely providing content over a network, comprising:
  a first component that is operative to perform actions, including:
    receiving selectively encrypted content and a key chain, the selectively encrypted content being encrypted with a content key, the key chain comprising the content key being encrypted with a first access key;
    receiving the first access key;
    encrypting the first access key with a second access key;
    modifying the key chain by appending the encrypted first access key to the key chain;
    appending the modified key chain to the selectively encrypted content; and
    sending the modified key chain and selectively encrypted content over the network;
  a second component that is operative to perform actions, including:
    receiving the modified key chain and selectively encrypted content;
    receiving the second access key;
    encrypting the second access key with a distribution key;
    further modifying the key chain by appending the encrypted second access key to the key chain; and
    sending the selectively encrypted content and further modified key chain over the network; and
  a third component that is operative to perform actions, including
    receiving the selectively encrypted content and further modified key chain;
    employing the distribution key to decrypt the second access key;
    employing the second access key to decrypt the first access key;
    employing the first access key to decrypt the content key; and
    employing the content key to decrypt the content.

17. The system of claim 16, wherein the second component is an untrusted relay component that is configured to be incapable of employing the second access key to decrypt the first access key.

18. The system of claim 16, wherein the key chain is provided within an ECM that is multiplexed with the selectively encrypted content.

19. The system of claim 16, wherein the key chain is provided within a variable sized ECM.

20. The system of claim 16, the action of the second component further comprising providing the distribution key within an EMM in-band with the selectively encrypted content.

21. An apparatus for use in securely relaying content, comprising:
  a transceiver configured to receive content combined with a key chain, the content being selectively encrypted with a content key, the key chain comprising:
    the content key, the content key being encrypted with a first access key, and
    n additional access keys, where n is an integer value greater than 1, and each n access key is encrypted with an n+1 access key and appended to a prior encrypted access key and the encrypted content key to generate the key chain;
  means for receiving the last access key in the n+1 access keys;
  means for encrypting the last access key using an last +1 access key;
  means for appending the encrypted last access key to the key chain; and
  means for providing the last +1 access key to another apparatus.

22. A system for use in securely relaying content, comprising:
  a first apparatus, comprising:
    a processor; and
    a memory in communication with the processor and for use in storing data and machine instructions that causes the processor to perform actions, including:
      receiving content, the content being selectively encrypted with a content key;
      receiving with the selectively encrypted content, a key chain, the key chain comprising the content key, the content key being encrypted with a first access key;
      receiving the first access key;
      encrypting the first access key using a second access key;
      appending the encrypted first access key to the key chain, wherein the key chain comprises the encrypted content key, and the encrypted first access key; and
      providing the second access key to a second apparatus; and
  the second apparatus, that is configured to perform actions if the second apparatus is a trusted system, including:
    employing the second access key to decrypt the first access key;
    employing the first access key to decrypt the content key; and
    employing the content key to decrypt the content.

* * * * *